Sept. 19, 1967  R. NOUEL  3,342,456
HYDROMECHANICAL CLAMPS
Filed March 22, 1966  8 Sheets-Sheet 6

INVENTOR
ROBERT NOUEL
BY
Cushman, Darby & Cushman
ATTORNEYS

United States Patent Office 3,342,456
Patented Sept. 19, 1967

3,342,456
HYDROMECHANICAL CLAMPS
Robert Nouel, Villejuif, France, assignor to Inventions Finance Corporation, a corporation of Delaware
Filed Mar. 22, 1966, Ser. No. 536,471
1 Claim. (Cl. 254—93)

The present application is a continuation-in-part of my applications Nos. 173,103, 187,480, 206,508, 273,241.

According to the present invention, there is provided a force-multiplying device comprising first and second pairs of force-multiplying jaws, first driving means for turning one jaw of each pair relatively to the other, and second driving means for displacing the first pair of jaws towards and away from the second pair of jaws, said second driving means comprising linking means interconnecting one jaw of said first pair and one jaw of said second pair for ensuring that movement of said one pair towards or away from said second pair is accompanied by corresponding movement of said second pair towards and away from said first pair, and vice versa.

Figure 1:
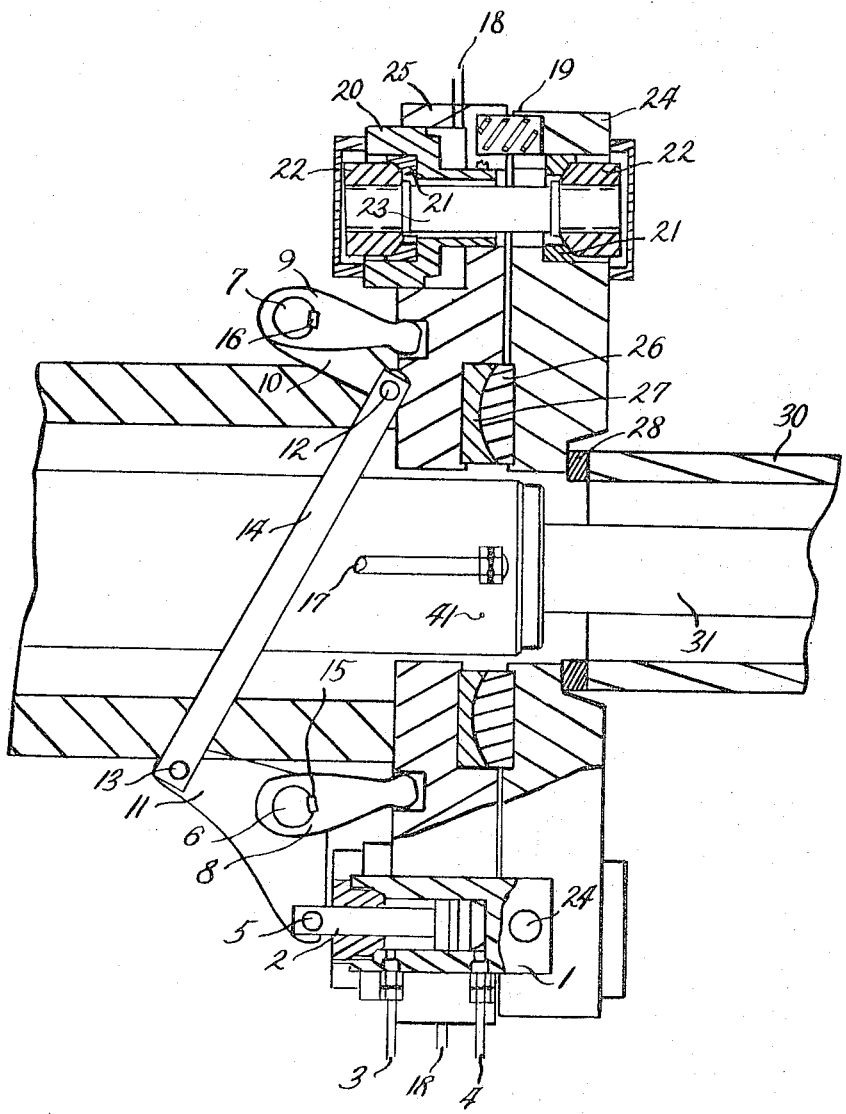
Figure 2:
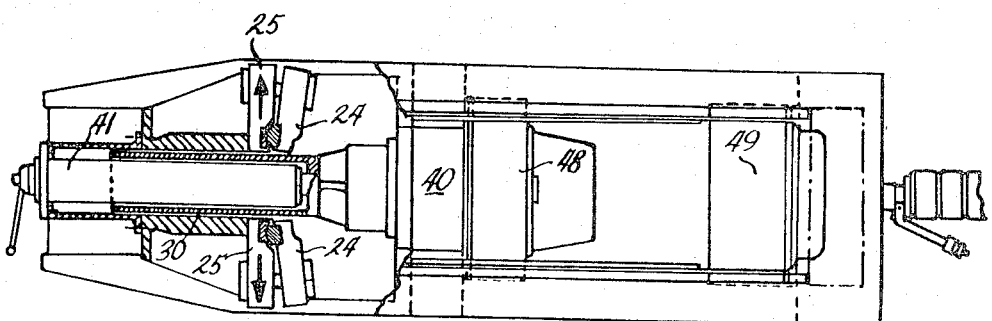

For a better understanding of the invention, and to show how the same may be carried into effect, reference will now be made, by way of example, to the accompanying drawings, in which:

FIGURE 1 shows an axial sectional view through a fluid-pressure operated force-multiplying device of an injection moulding machine, which device serves to clamp the mould of the machine, FIGURE 2 shows a sectional side elevation of part of an injection moulding machine prior to advance of the right-hand mould section towards the fixed left-hand mould section.

Figure 3:
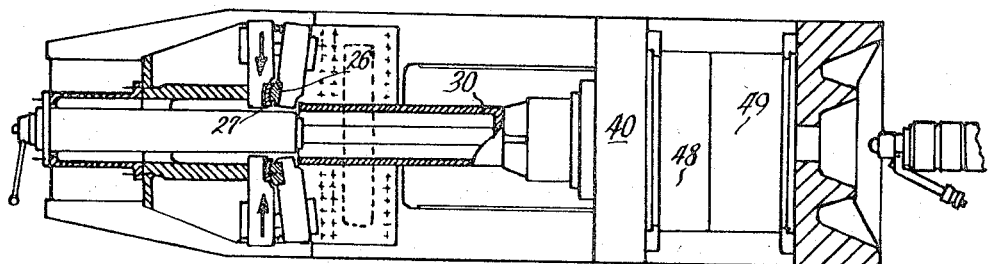
Figure 4:
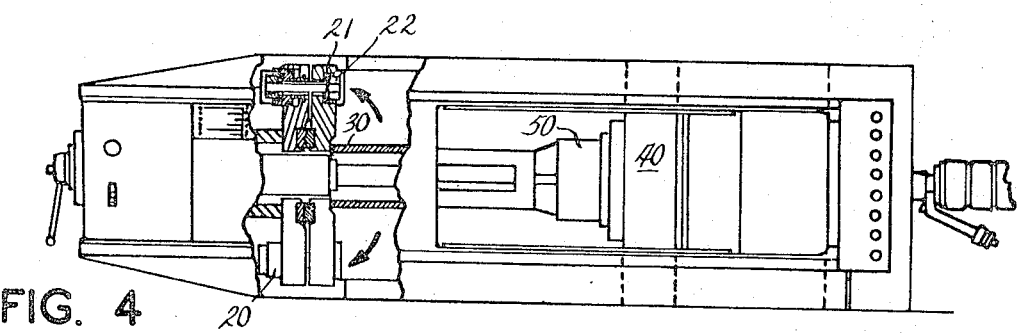
Figure 5:
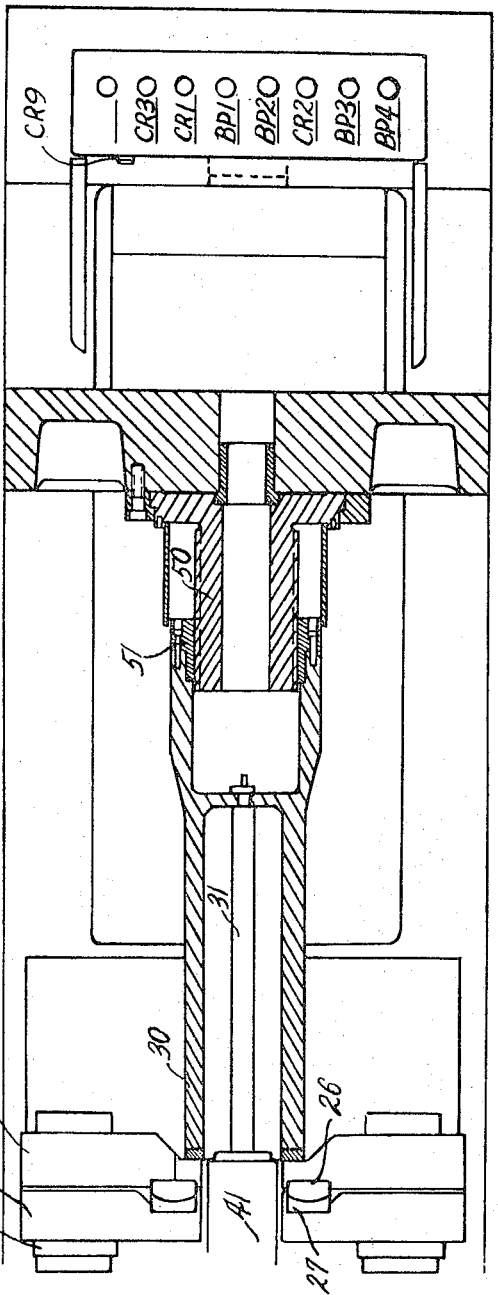
Figure 6:
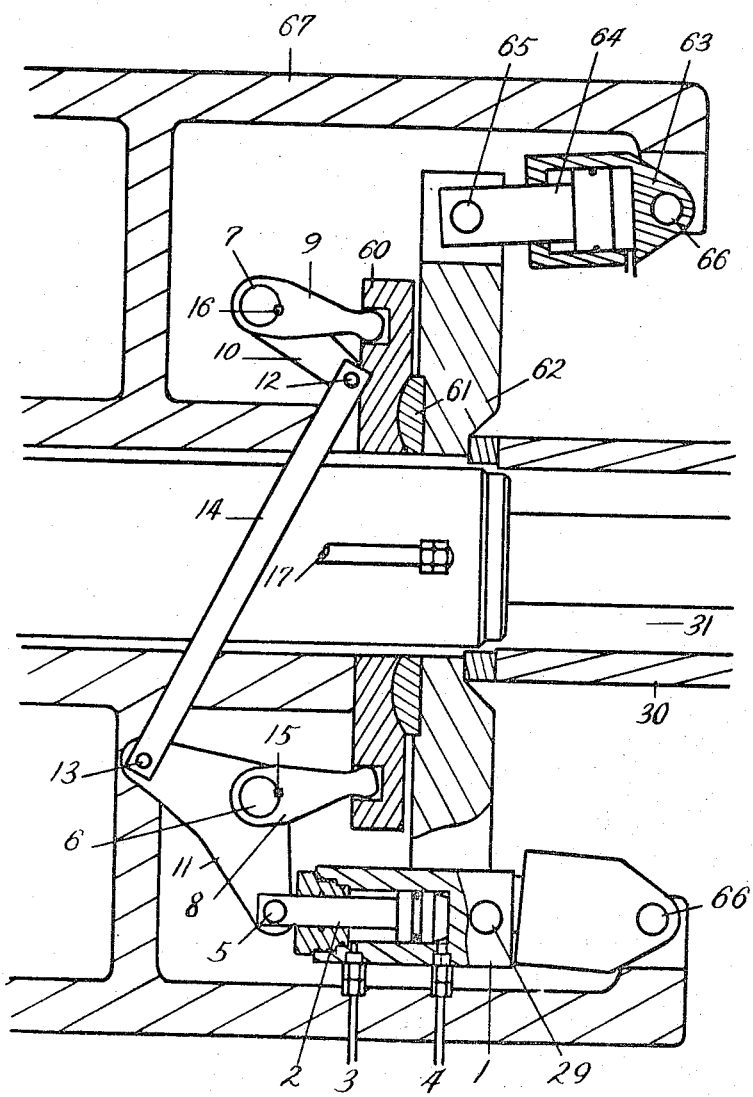
Figure 7:
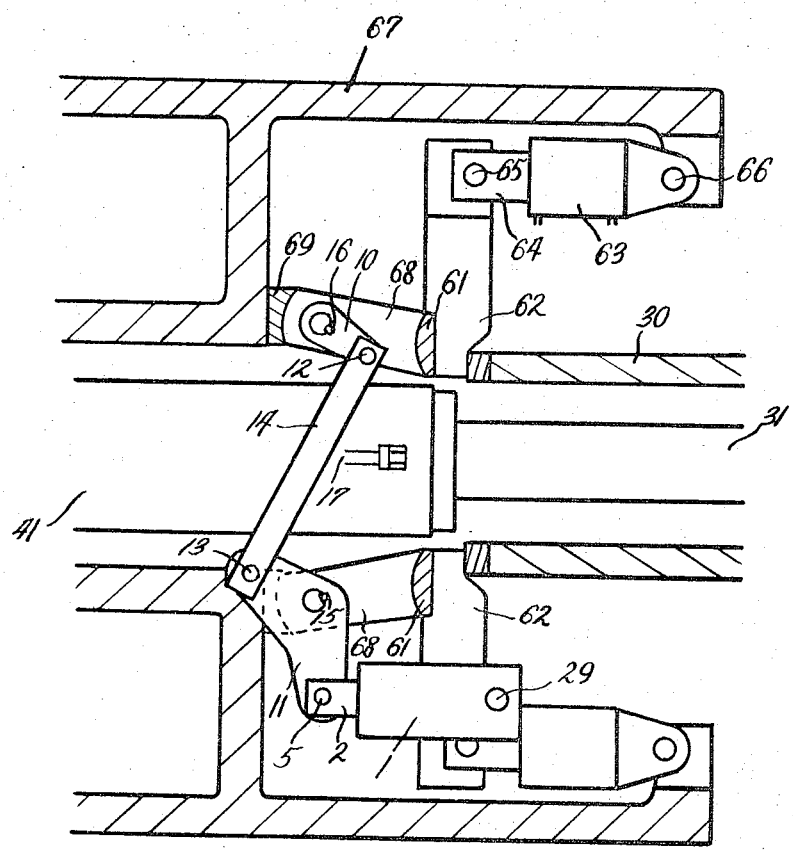
Figure 8:
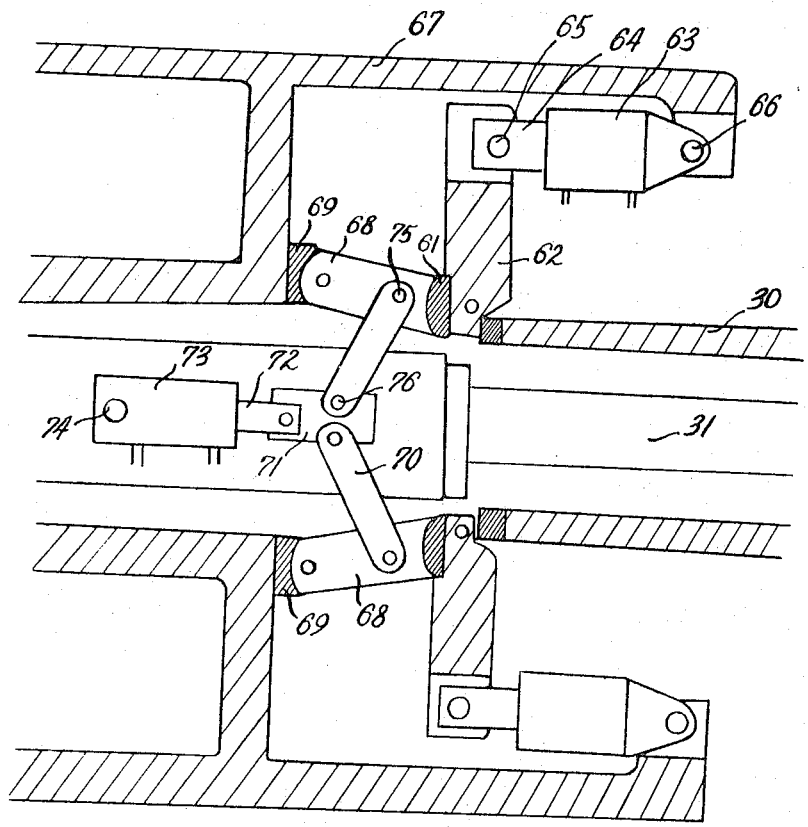
Figure 9:
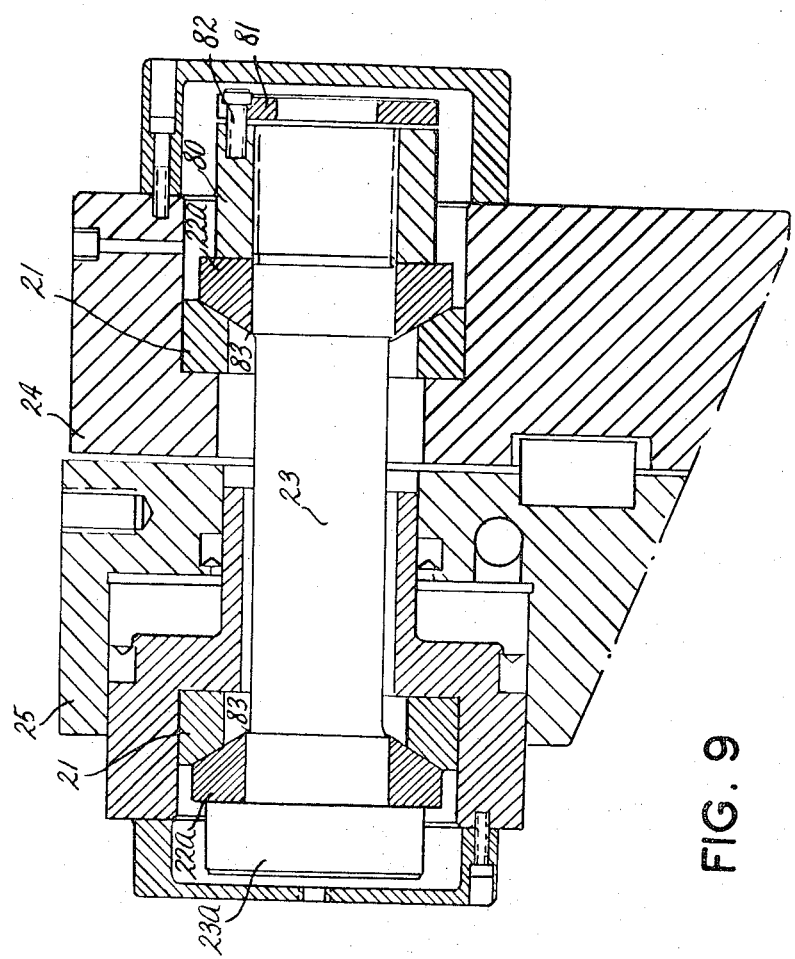
Figure 10:
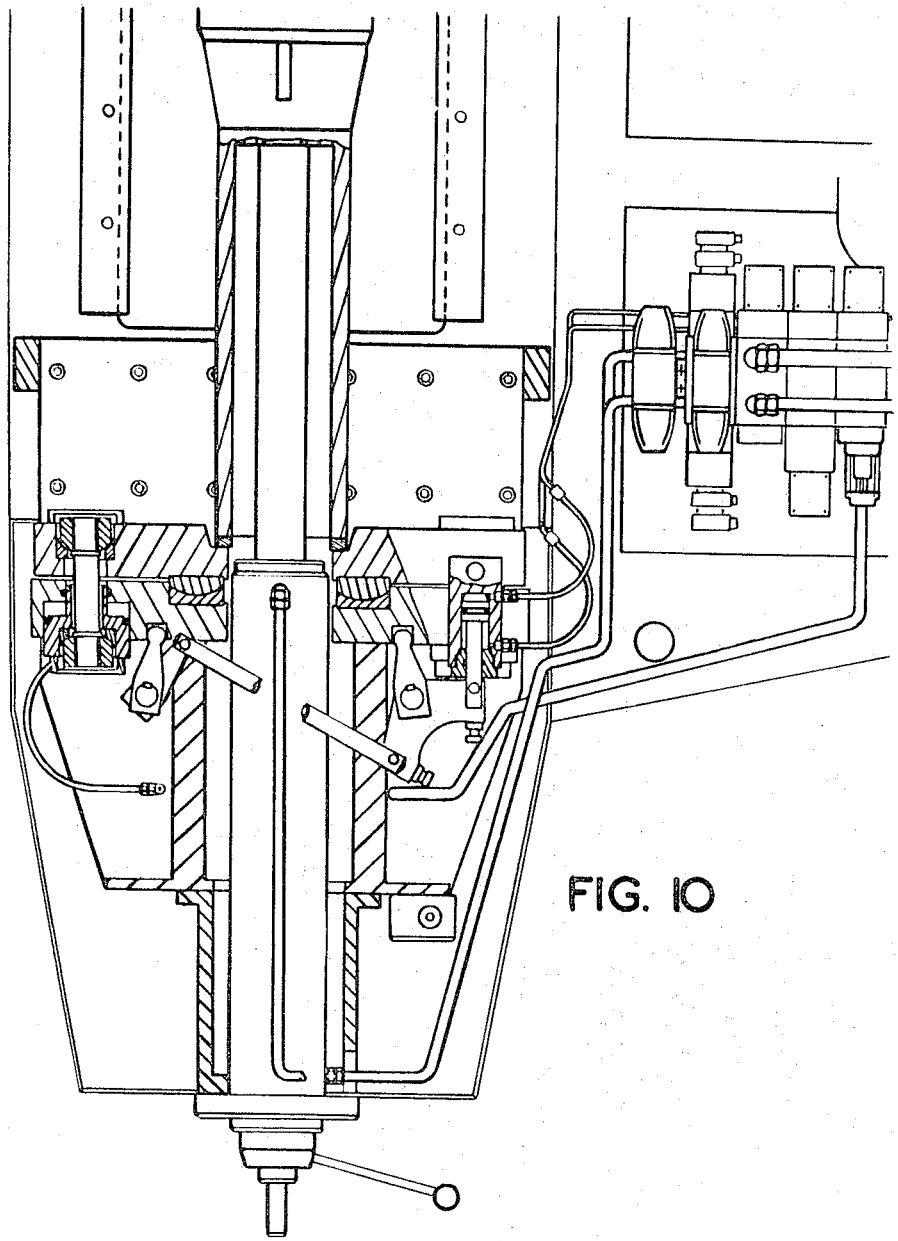

FIGURE 3 shows a view similar to FIGURE 2, and after the advance of the right-hand mould section but prior to clamping of the mould, FIGURE 4 shows a view similar to FIGURE 2, but after clamping of the mould, FIGURE 5 shows an axial section through another part of the machine, FIGURES 6 to 8 show axial sections through modified versions of parts of the machine, FIGURE 9 shows a section through another part of the machine, and FIGURE 10 shows various parts of the machine.

Referring to FIGURES 1 to 4, the connection between the fixed and movable jaws of each clamp is provided by a rod 23 and two ball segments 22 pivoting on seats 21. The hydraulic piston 20 on being fed with fluid through a duct 18 turns the jaws to close them whilst hydraulic return is effected by springs 19, although other hydraulic or pneumatic return means could be used. Further, in the case under discussion, the forward movement is intended to be synchronised. For this movement, two clamps are actuated by a linkage or jack. This linkage is balanced so that hardly any effort is required for this movement. We note that the same arrangement can be used to actuate 4, 6, 8 etc. clamps together which proportionally increases the closing pressure.

A hydraulic jack comprising a cylinder 1 and a piston 2, anchored to the frame of the machine or press by a pin 29, imparts a rotary movement to the shaft 6 through a rod 11 which in turn actuates a rod 14 which imparts a rotary movement to the shaft 7, the rod 10 acting as a connector. The two shafts 6 and 7 thus rotate simultaneously, but in different directions.

Keyed to these two shafts at 15 and 16 are rods 8 and 9. Each shaft can drive 1, 2, 3 etc. clamps. As the shafts rotate in opposite directions, the clamps simultaneously move away from and towards each other. We note that the balance is perfect in the most unfavorable position which is that shown in the accompanying drawing. The upper clamp exerts a pressure equal to its weight on the linkage. This downward pressure acts upwards through the intermediary of the system on the rod 15 which tends to lift the lower jaw of equal weight. The three operational positions of the press with the approach and withdrawal of the clamps, are shown quite clearly in FIGURES 2 to 4. The passage of the slide(way) between the clamps can also be seen. This system thus embodies an extremely compact group of closure members. The movable plate 40 is actuated by a hydraulic jack 41 accommodated directly in the slideway 30.

This synchronisation system has many advantages, including the balancing of efforts, a single jack for forward movement, greater safety, rapidity by virtue of the end-of-stroke clampers in the jack 41, identical number of safety contacts irrespective of the number of clamps.

We also notice the same principle of closure enables the clamps to be disengaged before the press is opened on completion of the injection operation. Consequently, the release line of the clamps is not included in the period during which the press is open.

Finally, this assembly consisting of the linkage system and the clamps provides a compact group of closure members which operate quickly and in perfect synchronism. In addition greater safety is obtained by simplification of the electrical safety system.

Referring to FIGURE 5, to complete the closure group and to enable the thickness of the mould to be adjusted, a nut and screw system 50, 51 has been provided between the main slideway 30 and the movable plate 40.

Referring to FIGURE 6, another embodiment of the group of closure members is possible which, in this case, would bear against the frame of the press (accompanying drawing).

In this embodiment, the linkage which synchronises the forward movement of the clamps is the same. The clamps have been modified and are no longer autonomous.

The slide 60 acting as a female pivot is moved downwards through the intermediary of the rod linkage. Fixed to the pivoting clamp is a male pivot 61. At the same time, a pin 65 transmits the force of a double acting jack 64, 63. A pin 66 transmits the pressure to the frame. This double acting jack causes the movable clamp to pivot, the main section assisting closure, and the small section return.

Referring to FIGURE 7 in this embodiment it also bears against the frame of the press. In this case, however, the forward movement of the clamps along a straight line produced by the slide 60 acting as a female pivot, has been replaced by a forward movement produced by the pivoting of the rods 68. These rods 68 function under the same conditions as the rods 8 and 9. Handle pivots 69 act as supports.

This arrangement embodies the same advantages as FIGURE 6 except that the forward movement produced by pivoting avoids slides in the frame 64 which, as a result, is simplified. Accordingly, the system of rods is more compact. We note that the rods 68 can act as female pivots for a larger number of movable clamps 62. In this case, these rods form two general pressure-absorbing lines.

The embodiment of FIGURE 8 differs from that of FIGURE 7 as regards the method of advance beneath the part to be blocked.

In the latter case, it is provided by a ball and socket joint which makes the rods 68 pivot. The piston 72 pushes a slide 71 around which pivot 2 rods 70 through the intermediary of two pins 76. Two pins 75 transmit the movement to the rods 68.

The forward movement of the jacks 72, 73, 74 moves the clamps apart, whilst the return movement engages them.

A system of this kind has the advantage that the rods are symmetrical and there are no keyed connections, although unfortunately the system is not balanced. Accordingly the slide 71 rubs against the lower part of the press during its horizontal stroke.

Referring to FIGURE 9, in the clamp-type jack, one view represents a slightly different construction in the mounting of the central traction rod 23.

This modification provides an improvement in the fatigue strength of this rod. This is because, in the critical zone 83, the shaft has been strengthened whereas, in the previous design, sharp angles detrimentally affecting fatigue strength were created by badly screwed ball joints 22.

In addition, the feet 22a consisting of niturated steel are much easier to manufacture. Locking in position is by means of the washer 81 and the screws 82.

FIGURE 10 shows an ensemble of various parts of the machine.

It will be noted that the machine has provision for automatic greasing of various members thereof.

I claim:

A force-multiplying device comprising first and second pairs of force-multiplying jaws, first driving means for turning one jaw of each pair relatively to the other, and second driving means for displacing the first pair of jaws towards and away from the second pair of jaws, said second driving means comprising linking means interconnecting one jaw of said first pair and one jaw of said second pair for ensuring that movement of said one pair towards or away from said second pair is accompanied by corresponding movement of said second pair towards and away from said first pair, and vice versa.

References Cited

UNITED STATES PATENTS

| | | | |
|---|---|---|---|
| 3,179,981 | 4/1965 | Gravesen | 18—30 |
| 3,242,249 | 3/1966 | Nouel | 269—32 |
| 3,262,158 | 7/1966 | Von Reimer et al. | 18—30 |

OTHELL M. SIMPSON, *Primary Examiner.*